United States Patent
Maedako et al.

(10) Patent No.: US 8,643,344 B2
(45) Date of Patent: Feb. 4, 2014

(54) CONDENSIVE LOAD PROTECTION DEVICE OF SELF-EXCITED GENERATOR

(75) Inventors: Minoru Maedako, Saitama (JP); Yasuhiro Nakada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 501 days.

(21) Appl. No.: 12/915,688

(22) Filed: Oct. 29, 2010

(65) Prior Publication Data
US 2011/0101929 A1 May 5, 2011

(30) Foreign Application Priority Data
Nov. 2, 2009 (JP) .................... P2009-251920

(51) Int. Cl.
*H02P 9/00* (2006.01)
(52) U.S. Cl.
USPC .............................. 322/44; 322/89
(58) Field of Classification Search
USPC .................... 322/37, 44, 28, 24, 89
See application file for complete search history.

(56) References Cited

U.S. PATENT DOCUMENTS

| | | | | |
|---|---|---|---|---|
| 3,868,558 | A * | 2/1975 | Winkley et al. | 322/28 |
| 5,157,321 | A * | 10/1992 | Kato et al. | 322/28 |
| 5,243,270 | A * | 9/1993 | Mayumi et al. | 322/28 |
| 5,448,154 | A * | 9/1995 | Kanke et al. | 322/28 |
| 5,936,440 | A | 8/1999 | Asada et al. | |
| 6,204,643 | B1 * | 3/2001 | Kouwa et al. | 322/28 |
| 7,514,906 | B1 * | 4/2009 | Tsujimoto et al. | 322/37 |
| 2002/0027426 | A1 * | 3/2002 | Okahara et al. | 322/28 |
| 2002/0047691 | A1 * | 4/2002 | Asada et al. | 322/28 |
| 2008/0238373 | A1 * | 10/2008 | Eldery et al. | 322/28 |
| 2009/0108908 | A1 | 4/2009 | Yamadaya | |
| 2010/0079117 | A1 * | 4/2010 | Bekiarov | 322/28 |
| 2012/0286744 | A1 * | 11/2012 | Tunzini et al. | 322/24 |

FOREIGN PATENT DOCUMENTS

| | | |
|---|---|---|
| EP | 2 056 444 A2 | 5/2009 |
| JP | 8-140400 A | 5/1996 |
| JP | 2006-280014 A | 10/2006 |

OTHER PUBLICATIONS

European Search Report issued on Nov. 7, 2011.
Office Action, Japanese patent Application No. 2009-251920 mailing date Aug. 21, 2013.

* cited by examiner

*Primary Examiner* — Tulsidas C Patel
*Assistant Examiner* — Viet Nguyen
(74) *Attorney, Agent, or Firm* — Arent Fox LLP

(57) ABSTRACT

In a self-excited generator 1 including an automatic voltage regulator (AVR) 10, a condensive load protection device includes: a field current control driver 21 which is connected to the field winding 6 in series and controlled to be ON/OFF by a drive circuit 23 of the AVR 10 to supply a field current to the field winding 6; and a condensive load protecting rotor short-circuit driver 22 which is connected in parallel to the field winding 6, and supplies a short-circuit current to the field winding 6 by being turned ON, and a bootstrap circuit 30 is connected as a drive power supply of the field current control driver and the condensive load protecting rotor short-circuit driver, and the bootstrap circuit 30 includes a capacitance portion 32 in which charges are accumulated when the field current control driver 21 is ON.

3 Claims, 3 Drawing Sheets

PRIOR ART

CONDENSIVE LOAD PROTECTION DEVICE OF SELF-EXCITED GENERATOR

TECHNICAL FIELD

The present invention relates to a control device of an engine-driven power generator (self-excited AVR synchronous generator) which adjusts a generator output by regulating a current to be supplied to a field winding by an automatic voltage regulator (AVR), and specifically, to a condensive load protection device of a self-excited generator which protects an automatic voltage regulator (AVR) from a back electromotive force caused by armature reaction when a condensive load is connected to the generator.

BACKGROUND ART

A configuration of a self-excited AVR synchronous generator including a generation winding 2 and an excitation winding 3 wound on a stator side of the generator 1, a field winding 6 wound around a rotor 5 to be rotated by a drive source (engine) 4, a permanent magnet 7 fitted to the rotor 5 for generating an excitation current, and an automatic voltage regulator (AVR) 10 which regulates a current to be supplied to the field winding 6 as shown in FIG. 4, is described in Patent Literature 1.

The automatic voltage regulator (AVR) 10 connected to the field winding 6 via a brush 8 includes a commutator 11 having an input side to which both ends of the excitation winding 3 are connected, a capacitor 12 provided between the commutator 11 and the ground to smooth an output voltage of the commutator 11, a flywheel diode 13 connected in parallel to the field winding 6, a transistor 14 which is controlled to be turned ON/OFF to supply a field current to the field winding 6, and a field current drive circuit (field current driving means) 15 which PWM-controls a field current. One end of the field winding 6 is connected to the output side of the commutator 11, and the other end of the field winding 6 is connected to the collector side of the transistor 14.

The flywheel diode 13 is provided for absorbing a surge voltage caused in case of power supply stop and smoothing the field current when PWM-controlling the field current flowing in the field winding 6.

The output side of the generation winding 2 is connected to a load 9 via a brush 8, and is configured so that a detected output voltage is input into the field current drive circuit 15.

The automatic voltage regulator (AVR) 10 operates to hold a voltage to be output from the generation winding 2 at a voltage set in advance by regulating a current to be supplied to the field winding 6 by turning ON/OFF the transistor 14.

In the self-excited AVR synchronous generator, when a capacitive load which is a condensive load is connected as the load 9, magnetization of the rotor 5 occurs due to armature reaction. Therefore, due to a predetermined or more condensive load current, as shown in FIG. 5B, a phenomenon occurs in which a back electromotive voltage is generated in the field winding 6 of the rotor 5. At this time, the back electromotive voltage (overvoltage) is applied to the AVR as a rotor excitation control unit, so that when it has no protective function, a commutating device, etc., such as the capacitor 12 inside the AVR 10 may be broken by the overvoltage. FIG. 5A is a schematic circuit diagram showing a current flowing in the excitation winding 3 and the field winding 6 in a normal state where no condensive load is connected. In FIGS. 5A and 5B, instead of the transistor 14 as a switching element in FIG. 4, a field current control FET 14 is used.

Conventionally, as a condensive load protecting short circuit for suppressing a back electromotive voltage, as shown in FIG. 6, a self-bias circuit 40 including two bipolar transistors Darlington-connected is used. With this circuit, due to a back electromotive force according to armature reaction of a condensive load, a base current ib flows from the rotor (field winding 6) to the transistor 42 via a lead resistor 41, and a short-circuit current is flows according to short-circuiting of the transistor 43.

CITATION LIST

Patent Literature

Patent Literature 1 Japanese Published Unexamined Patent Application No. I-108-140400

SUMMARY OF INVENTION

Technical Problem

Devices such as transistors and FETs, etc., are used for forming a condensive load protecting short circuit, however, in the above-described self-bias circuit 40, a sufficient gate voltage for the transistors 42 and 43 cannot be obtained with a back electromotive voltage generated in the rotor 5, so that the devices cannot be used in a saturation region of operation, and a large-scale device the heat generation of which is great becomes necessary.

Further, the heat generation from the devices must be suppressed by connecting a large lead resistor 41 for voltage drop to the base of the transistor 42.

Further, if PNP transistors and Pch-FETs which are easy to handle in the circuit are used, the cost becomes expensive, and there is no high-capacity device suitable for the circuit.

Specifically, in a self-bias circuit, a function necessary for the transistors 42 and 43 is only a short-circuiting operation, and if it is realized, heat generation of the devices inside the AVR can be suppressed and the protection device can be greatly downsized, and the possibility of circuit breakage due to a back electromotive voltage can be greatly reduced.

The present invention has been proposed in view of the above-described circumstances, and an object thereof is to provide a condensive load protection device of a self-excited generator which can be configured by using inexpensive devices, as a device for protecting an automatic voltage regulator (AVR) from a back electromotive force generated by armature reaction.

Solution to Problem

To achieve the above object, the present invention of the claim 1 having a first feature is a condensive load protection device of a self-excited generator (1) including an automatic voltage regulator (10) which supplies a current obtained by commutating an output of an excitation winding (3) wound in a generator to be driven by an engine to a field winding (6) according to fluctuation in a generator output voltage, comprising:

a field current control driver (21) which is connected to the field winding (6) in series and controlled to be ON/OFF by a drive circuit (23) of the automatic voltage regulator (10) to supply a field current to the field winding (6); and a condensive load protecting rotor short-circuit driver (22) which is connected in parallel to the field winding (6), and supplies a short-circuit current to the field winding (6) by being turned ON, wherein a bootstrap circuit (30) is connected as a drive power supply of the field current control driver and the condensive load protecting rotor short-circuit driver, and the bootstrap circuit (30) includes a capacitance portion (32) in which charges are accumulated when the field current control driver (21) is ON.

The present invention of the claim 2 having a second feature is the condensive load protection device of a self-excited generator according to claim 1, wherein the field current control driver (21) and the condensive load protecting rotor short-circuit driver (22) consist of N channel-MOSFETs.

The present invention of the claim 3 having a third feature is the condensive load protection device of a self-excited generator according to claim 1, comprising a control means (24) which always operates the field current control driver (21) and the condensive load protecting rotor short-circuit driver (22) in a mutually inverted manner.

The present invention of the claim 4 having a forth feature is the condensive load protection device of a self-excited generator according to claim 3, wherein the control means (24) voltage-drives the field current control driver (21) and the condensive load protecting rotor short-circuit driver (22) at different timings by controlling the drivers with arbitrary pulse widths in arbitrary phases.

Advantageous Effects of Invention

According to the present invention having a first feature, by providing a condensive load protecting rotor short-circuit driver (22), the AVR is prevented from being broken by a back electromotive force which is generated in the field winding (6), and the capacitance portion (23) is used as a power supply independent of the condensive load protecting rotor short-circuit driver (22).

Specifically, by using a bootstrap circuit as a drive power supply of each driver, a gate voltage sufficient for operating both of the field current control driver (21) and the condensive load protecting rotor short-circuit driver (22) in a saturation region can be secured by a power supply of one system. As a result, heat generation of each driver when it is turned ON can be suppressed, and a small-sized device can be adopted as each driver.

According to the present invention having a second feature, by using an inexpensive N channel-MOSFET as each driver, the entire device can be configured inexpensively.

According to the present invention having a third feature, by providing a control means (24) which always operates the drivers in a mutually inverted manner, the drivers can be prevented from being turned ON concurrently.

According to the present invention having a fourth feature, by controlling each driver with each arbitrary pulse width in each arbitrary phase, the drivers can be voltage-driven at different timings.

DESCRIPTION OF EMBODIMENTS

Figure 1:
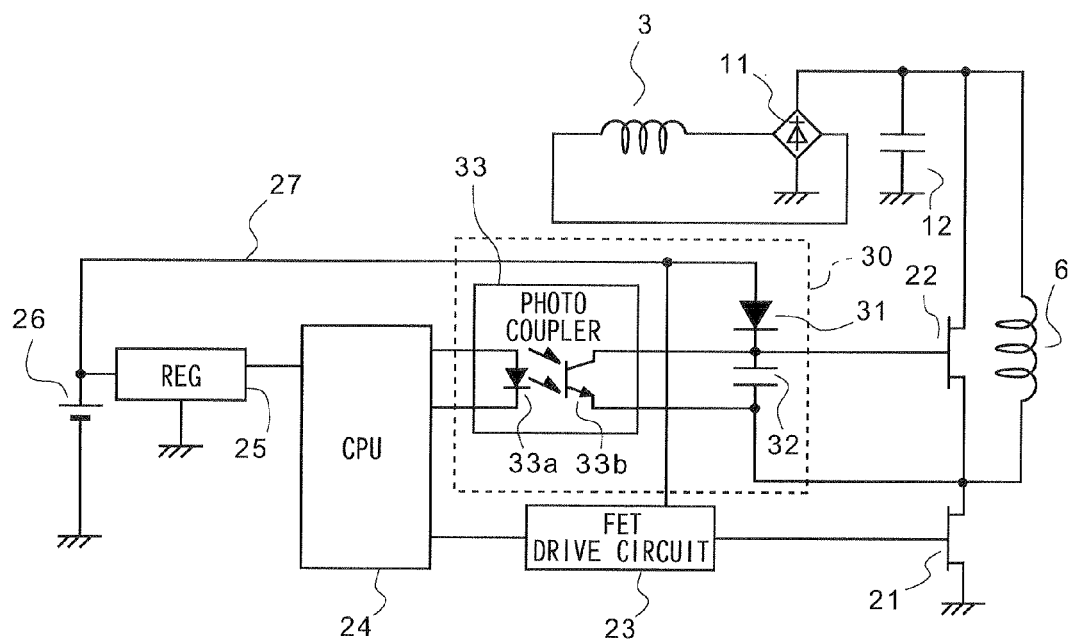
FIG. 1 is a block diagram showing an essential portion configuration of a condensive load protection device of a self-excited generator according to an embodiment of the present invention.

A condensive load protection device of a self-excited generator according to an embodiment of the present invention will be described with reference to the drawings. FIG. 1 is a block diagram showing an essential portion configuration of a condensive load protection device of a self-excited generator of the present invention. In FIG. 1, the portions having the same configuration as in FIG. 4 are designated with the same reference numerals.

Figure 4:
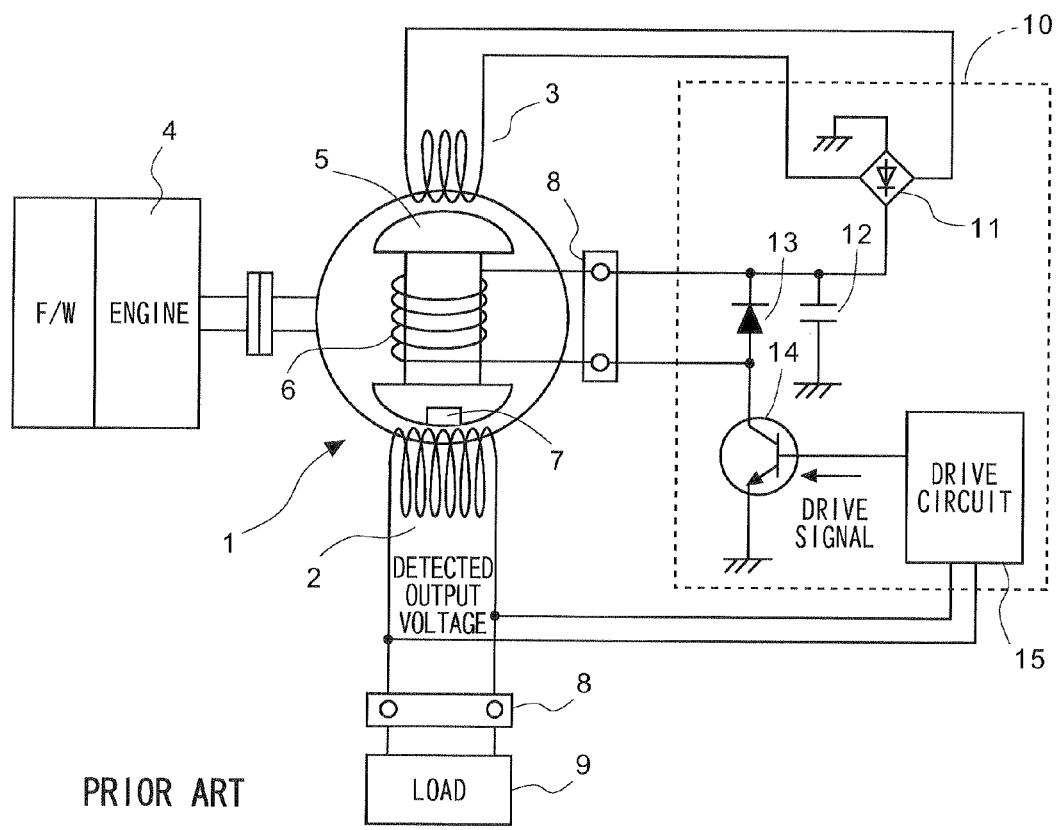
FIG. 4 is a configuration explanatory view showing a configuration of a general self-excited generator including an automatic voltage regulator (AVR).
Figure 5A:
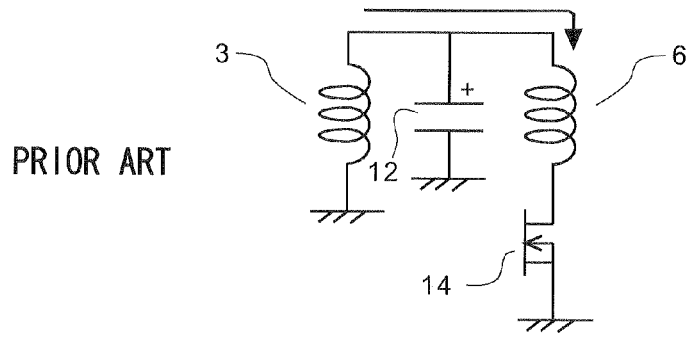
FIG. 5A is a schematic circuit diagram of a self-excited generator and shows a current flowing in a normal state.
Figure 5B:
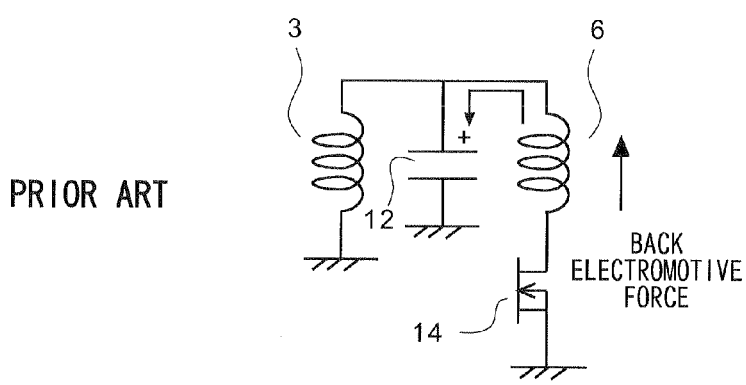
FIG. 5B is a schematic circuit diagram of a self-excited generator and shows a current flowing when a condensive load is connected.

As shown in FIG. 4, a self-excited generator 1 to which a condensive load protection device is connected is driven by an engine and includes an automatic voltage regulator 10 which supplies a current obtained by commutating an output of an excitation winding 3 wound in the generator by the commutator 11 to a field winding 6 according to fluctuation in a generator output voltage. A capacitor 12 is for smoothing the output voltage of the commutator 11.

To the field winding 6, a field current control driver 21 for supplying a field current to the field winding 6 is connected in series. This field current control driver 21 supplies a field current to the field winding 6 according to ON/OFF control by an FET drive circuit 23 of the automatic voltage regulator 10. The field current control driver 21 consists of an N channel-MOSFET using conduction electrons as carriers (n-type channel).

To the field winding 6, a condensive load protecting rotor short-circuit driver 22 which supplies a short-circuit current to the field winding 6 is connected in parallel. This condensive load protecting rotor short-circuit driver 22 is turned ON to supply a short-circuit current to the field winding 6 when a back electromotive force is generated in the field winding 6. The condensive load protecting rotor short-circuit driver 22 consists of an N channel-MOSFET using conduction electrons as carriers (n-type channel).

The gate portion of the field current control driver 21 is connected to a CPU 24 via the FET drive circuit 23. To the CPU 24, a predetermined power supply voltage (5V DC) for driving the CPU 24 is supplied from a DC power supply 26 (15V DC) for driving the condensive load protection device via a rated voltage power supply 25. To the FET drive circuit 23, the DC power supply 26 is connected as a drive power supply via a power wire 27.

Turning ON/OFF of the field current control driver 21 is controlled by an input of a PWM signal output the drive timing of which is adjusted into the gate portion of the field current control driver 21 from the FET drive circuit 23, and the field current to flow in the field winding 6 is accordingly controlled.

The gate portion of the condensive load protecting rotor short-circuit driver 22 is connected to the CPU 24 via a bootstrap circuit 30.

The bootstrap circuit 30 includes a diode 31, a capacitance portion 22, and a photo coupler 33 including a light emitting diode 33a and a phototransistor 33b, and the capacitance portion 32 is connected between the gate portion and the source portion of the condensive load protecting rotor short-circuit driver 22, and to the gate portion of the condensive load protecting rotor short-circuit driver 22 and the capacitance portion 32, the diode 31 on the forward side of the DC power supply 26 is connected via the power wire 27.

The output portion of the photo coupler 33 is connected to the gate portion of the condensive load protecting rotor short-circuit driver 22 and the source portion of the condensive load protecting rotor short-circuit driver 22 (drain portion of the field current control driver 21) so that the photo coupler becomes parallel to the capacitance portion 32.

The photo coupler 33 is for electrically insulating the condensive load protecting rotor short-circuit driver 22 and the CPU 24 from each other. Specifically, when the field current control driver 21 is OFF, the reference potential of the condensive load protecting rotor short-circuit driver 22 is different from that of the CPU 24, so that a drive signal of the CPU 24 is converted into an optical signal, and according to this optical signal, the condensive load protecting rotor short-circuit driver 22 is driven.

Specifically, the photo coupler 33 of the bootstrap circuit 30 and the FET drive circuit 23 control turning ON/OFF of the field current control driver 21 and the condensive load protecting rotor short-circuit driver 22 independently of each other in response to a drive signal from the CPU 24.

Therefore, in the bootstrap circuit 30, when the field current control driver 21 is ON (electrically continuous) and the condensive load protecting rotor short-circuit driver 22 is OFF (not electrically continuous) according to a drive signal from the CPU 24, charges are accumulated in the capacitance portion 32 from the DC power supply 26 via the diode 31, and when the field current control driver 21 is OFF (not electrically continuous), the drive signal from the CPU 24 is converted into an optical signal by the light emitting diode 33a, and according to this optical signal, the phototransistor 33b becomes electrically continuous, and accordingly, the output side of the photo coupler 33 is short-circuited, and the condensive load protecting rotor short-circuit driver 22 is driven according to charges accumulated in the capacitance portion 32 as an independent power supply.

Figure 2:
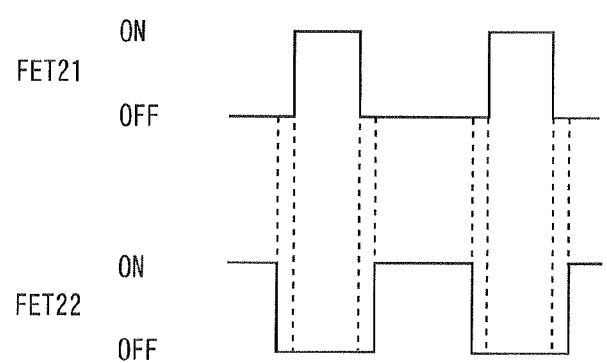
FIG. 2 is a timing chart for describing drive pulses for driving a field current control driver and a condensive load protecting rotor short-circuit driver.

The field current control driver 21 and the condensive load protecting rotor short-circuit driver 22 are controlled by the CPU 24 by using drive pulses which are always operated in an inverted manner (ON/OFF) (either one is always ON) as shown in FIG. 2. In order to reliably prevent the drive pulses of the field current control driver 21 and the condensive load protecting rotor short-circuit driver 22 from being turned ON concurrently, by providing a dead time for delaying a rise of one drive pulse with respect to a fall of the other drive pulse, both of field and condensive load protection are realized while preventing a synchronous short-circuit of both FETs.

By turning ON either the field current control driver 21 or the condensive load protecting rotor short-circuit driver 22, the condensive load protecting rotor short-circuit driver 22 is turned ON upon using a parasitic diode present between the source and the drain inside the condensive load protecting rotor short-circuit driver 22 as a fly diode, and the field current is synchronously commutated, and accordingly, loss can be reduced.

Next, detailed controls of the field current control driver 21 and the condensive load protecting rotor short-circuit driver 22 by the CPU 24 will be described.

The field current control driver 21 and the condensive load protecting rotor short-circuit driver 22 can be driven by power supplies independent of each other, so that they can be controlled with arbitrary pulse widths in arbitrary phases according to a control program of the CPU 24.

In the controls of the field current control driver 21 and the condensive load protecting rotor short-circuit driver 22 according to the drive pulses, when a condensive load is connected, excitation of the rotor becomes almost unnecessary due to magnetization, so that the ON duty of the field current control driver 21 can be made as close to zero as possible.

Figure 3:
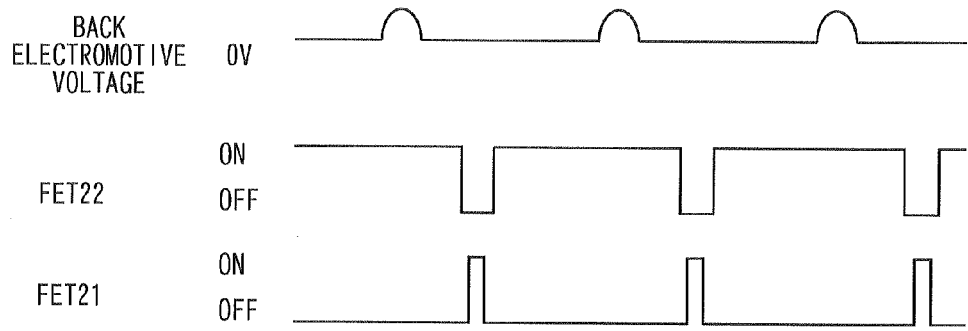
FIG. 3 is a timing chart for describing a relationship between a back electromotive force to be generated in the field winding and the drive pulses for the field current control driver and the condensive load protecting rotor short-circuit driver.

Specifically, as shown in FIG. 3, in the always inverted operation (ON/OFF) of the field current control driver 21 and the condensive load protecting rotor short-circuit driver 22, the ON time of the condensive load protecting rotor short-circuit driver 22 is set long, and the field current control driver 21 and the condensive load protecting rotor short-circuit driver 22 can be voltage-driven at different timings.

The field current can be properly controlled by controlling ON/OFF of the field current control driver 21 with an arbitrary pulse width in an arbitrary phase.

When a condensive load is connected, it is required that "the field current control driver 21 is OFF and the condensive load protecting rotor short-circuit driver 22 is ON" in a phase in which a back electromotive force is generated, and this can be easily set by a control program of the CPU 24.

Next, the operation of the condensive load protection device when the field current control driver 21 and the condensive load protecting rotor short-circuit driver 22 are controlled to be ON/OFF with the drive pulses at the timings shown in FIG. 3 will be described.

In the bootstrap circuit 30, when the field current control driver 21 is ON (electrically continuous) and the condensive load protecting rotor short-circuit driver 22 is OFF (not electrically continuous) according to a drive signal from the CPU 24, charges are accumulated in the capacitance portion 32 from the DC power supply 26 via the diode 31.

When the field current control driver 21 is OFF (not electrically continuous) and the condensive load protecting rotor short-circuit driver 22 is ON (electrically continuous), a short-circuit current caused according to a back electromotive force generated in the field winding 6 flows in the closed circuit including the field winding 6 and the condensive load protecting rotor short-circuit driver 22, and accordingly, the capacitor 12 on the AVR side is prevented from being influenced by the back electromotive force.

Specifically, according to the above-described configuration of the condensive load protection device of a self-excited generator, the field current control driver 21 and the condensive load protecting rotor short-circuit driver 22 are controlled to be ON/OFF, and by supplying a short-circuit current to the field winding 6 when the field current control driver 21 is OFF and the condensive load protecting rotor short-circuit driver 22 is ON, the circuit (capacitor 12, etc.) of the AVR can be prevented from being broken by a back electromotive force generated in the field winding 6.

According to the above-described configuration of the condensive load protection device, N channel-MOSFETs are used as the field current control driver 21 and the condensive load protecting rotor short-circuit driver 22, and are driven individually by independent power supplies realized by the bootstrap circuit 30. Therefore, a gate voltage sufficient for operation of the MOSFET of each driver in a saturation region can be secured, and both of the field current control driver 21 and the condensive load protecting rotor short-circuit driver 22 can be used in a saturation region by the DC power supply 26 of one system, so that heat generation of the MOSFETs is suppressed (heat generation loss is reduced). As a result, as the MOSFET, a small-sized device can be adopted, and an inexpensive high-capacity N channel-MOSFET can be used.

Figure 6:
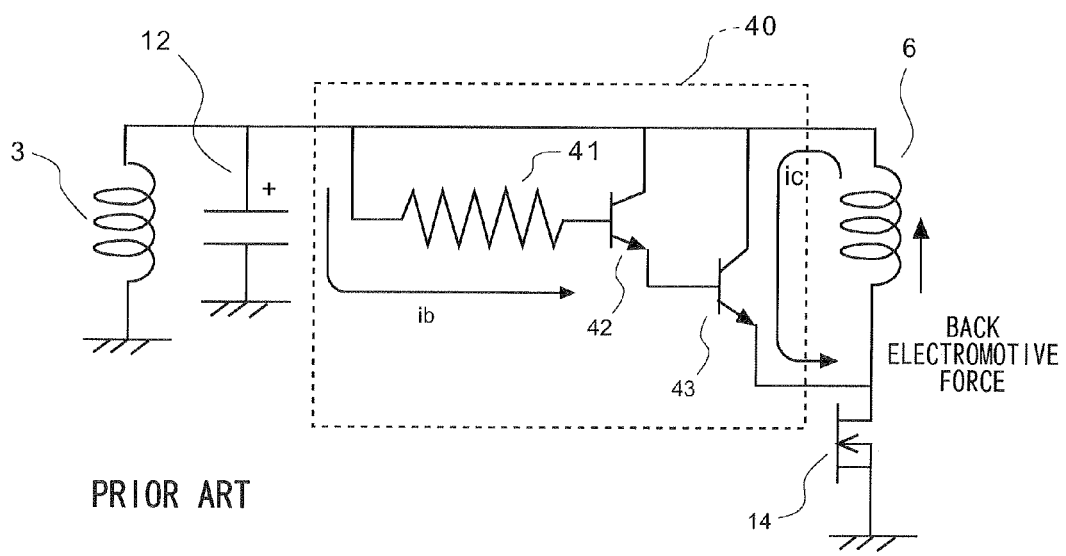
FIG. 6 is a schematic circuit diagram showing a configuration of a conventional condensive load protecting short circuit.

Comparison of the above-described condensive load protection device with a self-bias circuit 40 as a condensive load protecting short circuit shown in FIG. 6 will be described.

First, the condensive load protection transistors (transistors 42 and 43) which are operated by the self-bias circuit 40 cannot control a firing timing (passive operation). Specifically, in the case of the self-bias circuit 40, unless a condensive load is connected and a back electromotive force is generated in the field winding 6, the transistors 42 and 43 do not operate. Therefore, when digitizing (microcomputer-controlling) the AVR, in order to control the field current control FET 14 directly by a microcomputer when a condensive load is connected, a circuit and control for preventing synchronous turning ON (short-circuit) of the condensive load protection transistors (transistors 42 and 43) and the field current control FET 14 are necessary.

On the other hand, according to the above-described condensive load protection device, the CPU 24 controls the field current control driver 21 and the condensive load protecting rotor short-circuit driver 22 by using the bootstrap circuit 30, and accordingly, microcomputer control can be performed according to a predetermined program, and synchronous turning ON (short-circuit) of the drivers can be prevented by software.

In the CPU 24, even when microcomputer control according to a program is not used, by driving the field current control driver 21 and the condensive load protecting rotor short-circuit driver 22 according to reverse logic by a logic circuit, the same effect (heat generation suppression and downsizing) can be obtained.

When the condensive load protecting short circuit is formed by the self-bias circuit 40, as described above, unless a condensive load is connected and a back electromotive force is generated in the field winding 6, the transistors 42 and 43 do not operate. A failure mode of an FET and a transistor is short-circuited, and when the field current control FET (transistor) 14 in the self bias circuit 40 fails and short-circuits, the self-excited generator 1 may continue power generation while its output voltage is still overvoltage.

On the other hand, according to the condensive load protection device of the present embodiment, at the timing at which either the field current control driver (FET) 21 or the condensive load protecting rotor short-circuit driver (FET) 22 fails and short-circuits, a short-circuit state is caused in both of the FETs, so that both of the FETs are broken and the unit of the AVR is broken, however, the field current does not flow and the generator output does not increase, so that the generator can be prevented from continuing power generation while the voltage is still overvoltage.

REFERENCE SIGNS LIST

1 . . . self-excited generator
2 . . . generation winding
3 . . . excitation winding
4 . . . engine
5 . . . rotor
6 . . . field winding
7 . . . permanent magnet
8 . . . brush
9 . . . load
10 . . . automatic voltage regulator (AVR)
11 . . . commutator
13 . . . flywheel diode
14 . . . transistor (field current control FET)
15 . . . field current drive circuit
21 . . . field current control driver
22 . . . condensive load protecting rotor short-circuit driver
23 . . . FET drive circuit
24 . . . CPU (control means)
25 . . . rated voltage power supply
30 . . . bootstrap circuit
32 . . . capacitance portion
33 . . . photo coupler
40 . . . self-bias circuit

The invention claimed is:

1. A condensive load protection device of a self-excited generator including an automatic voltage regulator which supplies a current obtained by commutating an output of an excitation winding wound in a generator to be driven by an engine to a field winding according to fluctuation in a generator output voltage, comprising:
    a field current control driver configured to be connected to the field winding in series and controlled to be ON/OFF by a drive circuit of the automatic voltage regulator to supply a field current to the field winding;
    a condensive load protecting rotor short-circuit driver configured to be connected in parallel to the field winding, and supply a short-circuit current to the field winding by being turned ON;
    a bootstrap circuit configured to be connected as a drive power supply of the field current control driver and the condensive load protecting rotor short-circuit driver, and include a capacitance portion in which charges are accumulated when the field current control driver is ON; and
    control means configured to always operate the field current control driver and the condensive load protecting rotor short-circuit driver in a mutually inverted manner, and be connected to and electrically isolated from the condensive load protecting rotor short-circuit driver by a photo coupler.

2. The condensive load protection device of a self-excited generator according to claim 1, wherein the field current control driver and the condensive load protecting rotor short-circuit driver consist of N channel-MOSFETs.

3. The condensive load protection device of a self-excited generator according to claim 1, wherein the control means voltage-drives the field current control driver and the condensive load protecting rotor short-circuit driver at different timings by controlling the drivers with arbitrary pulse widths in arbitrary phases.

* * * * *